(12) United States Patent
Wang et al.

(10) Patent No.: US 11,174,346 B2
(45) Date of Patent: Nov. 16, 2021

(54) FLAME-RETARDANT POLYESTER FIBER AND ITS PREPARATION METHOD

(71) Applicant: JIANGSU HENGLI CHEMICAL FIBRE CO., LTD., Suzhou (CN)

(72) Inventors: Lili Wang, Suzhou (CN); Lixin Yin, Suzhou (CN); Qianhan Liu, Suzhou (CN); Feng Li, Suzhou (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 823 days.

(21) Appl. No.: 15/744,873

(22) PCT Filed: Oct. 25, 2016

(86) PCT No.: PCT/CN2016/103177
§ 371 (c)(1),
(2) Date: Jan. 15, 2018

(87) PCT Pub. No.: WO2017/113956
PCT Pub. Date: Jul. 6, 2017

(65) Prior Publication Data
US 2018/0201728 A1    Jul. 19, 2018

(30) Foreign Application Priority Data

Dec. 29, 2015 (CN) .......................... 201511017800.5

(51) Int. Cl.
| | | |
|---|---|---|
| *C08G 63/692* | (2006.01) | |
| *C08G 63/83* | (2006.01) | |
| *D01F 1/07* | (2006.01) | |
| *D01F 6/92* | (2006.01) | |
| *C08G 63/86* | (2006.01) | |
| *D01F 6/84* | (2006.01) | |
| *C25B 3/13* | (2021.01) | |
| *D01D 5/08* | (2006.01) | |

(52) U.S. Cl.
CPC ......... *C08G 63/6928* (2013.01); *C08G 63/83* (2013.01); *C08G 63/866* (2013.01); *C25B 3/13* (2021.01); *D01D 5/08* (2013.01); *D01F 1/07* (2013.01); *D01F 6/84* (2013.01); *D01F 6/92* (2013.01); *D10B 2401/04* (2013.01)

(58) Field of Classification Search
None
See application file for complete search history.

(56) References Cited

FOREIGN PATENT DOCUMENTS

| | | | |
|---|---|---|---|
| CN | 101307139 | A | 11/2008 |
| CN | 101333287 | A | 12/2008 |
| CN | 101759947 | A | 6/2010 |
| CN | 102181958 | A | 9/2011 |
| CN | 102277653 | A | 12/2011 |
| CN | 102277653 | * | 6/2013 |
| CN | 105463610 | A | 4/2016 |
| CN | 105482084 | A * | 4/2016 |
| CN | 104499084 | B * | 11/2016 |
| JP | 2005105203 | A | 4/2005 |

OTHER PUBLICATIONS

English machine translation of CN102277653 (Year: 2013).*
Espacenet translation of CN-104499084-B. (Year: 2016).*
Espacenet translation of CN-105482084-A. (Year: 2016).*
Wei Xuemei et al., Studies on preparation of Flame-Retardant Poly(ethylene Terephthalate) and its Structure and Properties, Journal of Textile Research, vol. 29. (Year: 2008).*
Translation of Studies on preparation of Flame-Retardant Poly(ethylene Terephthalate) and its Structure and Properties, LinguaLinx Language Solutions, Inc. (Year: 2021).*
Merriam-Webster, Undertake, https://www.merriam-webster.com/dictionary/undertakes. (Year: 2021).*

* cited by examiner

*Primary Examiner* — Marla D McConnell
*Assistant Examiner* — Christine X Nisula
(74) *Attorney, Agent, or Firm* — Bayramoglu Law Offices LLC

(57) ABSTRACT

A flame-retardant polyester fiber obtained by spinning flame-retardant polyester and irradiating with ultraviolet light and having a limiting oxygen index value of greater than 30. Flame retardant 2-carboxyethylphenylphosphinic acid to improve the flame retardant properties of polyester, the use of polyester containing unsaturated double bond in UV irradiation, the double bond opens to form a crosslinking point, the formation of a certain amount of the network structure improves the heat-resistant temperature of the poly-fiber and improves the anti-dripping performance of the polyester fiber.

2 Claims, No Drawings

FLAME-RETARDANT POLYESTER FIBER AND ITS PREPARATION METHOD

CROSS-REFERENCE TO RELATED APPLICATIONS

This application is the national stage entry of International Application No. PCT/CN2016/103177, filed on Oct. 25, 2016, which claims the benefit of priority from Chinese Patent Application No. CN201511017800.5, filed on Dec. 29, 2015, the entire contents of which are incorporated herein by reference.

TECHNICAL FIELD

The invention discloses the technical field of preparation method of polyester industrial yarn, which relates to a flame-retardant polyester fiber and a preparation method of the same. Particularly, a polyester fiber containing unsaturated double bonds and polycondensation catalyst using a mixture of magnesium ethylene glycol and antimony ethylene glycol and flame retardant polyester fiber and preparation method thereof.

BACKGROUND

Polyethylene terephthalate has the advantages of high modulus, high strength, heat resistance and good shape retention. It is widely used in the field of fiber and non-fiber, and closely related to people's production and life. With the application of polyester materials in civil buildings, home appliances, electronic appliances and other fields, their safety performance, especially the flame retardant properties, are put forward higher requirements. Phosphorus flame retardants in polyester based on solid phase charring and quality retention mechanisms and some gas flame retardant mechanism, not only reduce the heat release rate of the material, has good flame retardancy, but also reduce corrosion and toxic gases and the amount of smoke released can therefore overcome many of the disadvantages of halogenated flame retardants. Halogen-free flame retardants currently used in PET polyesters are mainly phosphorus-based flame retardants. An important way for such flame retardants to achieve flame retardancy is to promote PET droplet, so as to make the ignition part leave the fire source and increase the combustion PET surface quality loss and heat loss to achieve the purpose of flame retardant. However, in many applications (such as uniforms and protective clothing, etc.), the generation of droplet must be avoided. Therefore, the flame retardancy of polyester using the conventional phosphorus-containing flame retardant inevitably encounters the problem that the droplet is hard to solve.

Flame retardant PET anti-droplet modification is mainly divided into two methods of blending and copolymerization. The main blending method is adding anti-dripping agent, which can improve the droplet property of PET by improving the physical structure of the polymer melt and the charcoal layer. Copolymerization methods are mainly the use of both reactive flame retardant and anti-droplet function of flame retardants, such as the introduction of inorganic nano-materials, and phosphorus together to increase the capacity of the composite into carbon, enhanced PET flame retardant and anti-droplet properties.

UV cross-linking is an environmentally friendly and energy-saving processing method. Photochemical reactions occur after exposure to ultraviolet light, causing polymerization to cross-link. Due to its energy-saving, safe and pollution-free environment, high production efficiency, suitable for assembly line production and many other advantages, so the rapid development.

The invention uses 2-carboxyethylphenyl hypophosphorous acid (CEPPA) as a flame retardant, introduces an unsaturated double bond into the polyester, and completes the cross-linking reaction during the fiber spinning so as to make the fiber be flame retardant with anti-droplet performance.

SUMMARY

The present invention discloses a flame-retardant polyester fiber and its preparation method, which is a polyester containing an unsaturated double bond, a flame retardant, and a polyester obtained by using polycondensation catalyst that is a mixture of magnesium glycol ethylene glycol and antimony ethylene glycol polyester fiber and its preparation method. The present invention uses a mixture of magnesium ethylene glycol and antimony ethylene glycol as polycondensation catalyst, thus it has a small thermal degradation coefficient, and thermal degradation coefficient will be reduced to a minimum. As a result, it also ensures the stability of the unsaturated double bond in the production of polyester.

The present invention discloses a flame-retardant polyester fiber. The flame-retardant polyester fiber according to the present invention is obtained by the flame-retardant polyester fiber being spun and irradiated by ultraviolet light. The flame-retardant polyester fiber has a maximum oxygen index value greater than 30, and the fiber has good anti-drop properties on the basis of flame-resistance. Flame-retardant polyester is obtained by the esterification reaction of terephthalic acid, unsaturated dibasic acid and ethylene glycol followed by adding a flame retardant ethylene glycol 2-carboxyethyl phenyl phosphonic acid, and followed by the polycondensation catalyzed by the mixture of magnesium ethylene glycol and antimony ethylene glycol. Then the polyester sections are obtained by granulation.

The flame-retardant polyester according to the present invention contains, on average, 1 to 6 unsaturated double bonds provided by unsaturated dibasic acid molecules in one macromer chain.

A process for preparing the ultra-low shrinkage industrial yarn according to the present invention, wherein the molecular formula of magnesium ethylene glycol is $Mg(OCH_2CH_2OH)_2$.

In the invention, the flame retardant 2-carboxyethylphenylphosphinic acid is used to improve the flame retardancy of the polyester. Under the ultraviolet light irradiation, the double bond is opened by the unsaturated double bond contained in the polyester to form a crosslinking point, forming a certain amount of network structure, increasing the heat-resistant temperature of the polydextrose fiber, and improving the anti-dripping performance of the polyester fiber. Since the crosslinking is performed after the fiber is formed, the structural regularity and the crystallinity of the polyester are not damaged, to maintain the excellent performance of polyester.

Unsaturated polyesters are saturated polyesters and contain non-aromatic, unsaturated bonds in their molecular structure. Unsaturated polyesters are generally long-chain molecular structures. Unsaturated polyester long-chain molecules can occur between the crosslinking reaction to form a complex structure of large network molecules. The structure of reticular molecules is roughly divided into three categories: a uniform continuous reticular structure; an uneven continuous reticular structure in which relatively dense reticular structures are interconnected by less dense chain-type molecules; discontinuous mesh structure, a high density of continuous network structure is dispersed in the middle of unbonded components. The usual unsaturated polyester cross-linking mainly reacts to produce a non-uniform continuous network-based structure. Unsaturated polyester cross-linked mechanical properties, heat resistance, chemical resistance, flame retardant properties will have a more substantial increase. Select the cross-linking is completed in the fiber preparation, followed by UV-induced manner, to ensure that the polyester double bond's stability in the process.

A flame-retardant polyester fiber as described above, wherein the flame-retardant polyester fiber has a linear density deviation of ≤0.5%, a breaking strength of ≥3.5 cN/dtex, CV value of breaking strength of ≤5.0% and breaking extension of 33.0±3.0%, CV value of breaking extension ≤10.0%, the CV value of dry unevenness of ≤2.00%, the boiling water shrinkage of 7.5±0.5% and the oil content of 0.90±0.20%.

A process for preparing the flame-retardant polyester fiber as described above, wherein the mass ratio of magnesium ethylene glycol to antimony ethylene glycol is 2~3:1 in the mixture of magnesium ethylene glycol and antimony ethylene glycol.

The present invention also provides a method for preparing a flame-retardant polyester fiber, after the esterification reaction of terephthalic acid, unsaturated dibasic acid and ethylene glycol add a flame retardant 2-carboxyethylphenyl phosphine. Then the polyester is obtained by polycondensation under the catalysis of the mixture of the magnesium ethylene glycol and antimony ethylene glycol. Polyester sections are obtained after granulation. Then by metering, extrusion, cooling, oiling, stretching, heat setting, winding and UV irradiation, flame retardant polyester fiber can be obtained.

A process for preparing a flame retardant polyester fiber preparation method according to the present invention, wherein the main process is:

a. The Preparation of Catalyst (Magnesium Ethylene Glycol)

Add ethylene into the single-compartment electrolytic cell, magnesium chloride is electrolyte, the anode is magnesium, the cathode is graphite. Under DC, the initial voltage is 6 to 10V, the cathode current density is 150 to 200 mA, and electrolysis is carried out for 10 to 12 hours at 50 to 60° C. Remove the electrode after the electrolysis, we can get white suspension. Filter it under reduced pressure, wash the white solid with anhydrous ethanol, and we get magnesium ethylene glycol.

b. The Preparation of Flame Retardant

Mix 2-carboxyethylphenylphosphinic acid (CEPPA) and ethylene glycol at a molar ratio of 1:2 to 3, and the mixture is reacted at 100 to 120° C. for 30 to 60 min to synthesize 2-carboxyethylphenylphosphinic acid ethylene glycol ester (CEPPA-EG).

c. The Preparation of Polyester, Including the Esterification and Polycondensation The esterification reaction uses terephthalic acid, unsaturated dibasic acid and ethylene glycol as raw materials to obtain esterification products after reaction. The esterification reaction needs the increase of pressure in the nitrogen atmosphere, and the pressure is controlled in the scale of atmospheric pressure to 0.3 MPa, the temperature is controlled between 250 to 260° C. The end of the reaction is set after the amount of distillate water in the esterification reaction reaches 90% of the theoretical value at least. The condensation reaction, includes the low vacuum stage and the high vacuum stage of the condensation reaction:

In the low vacuum stage of such condensation reaction, the catalyst and stabilizer need to be added into the esterification production. The condensation reaction will start under the condition of negative pressure. In such period, the pressure needs to be pumped smoothly from atmospheric pressure to the pressure lower than the absolute pressure 500 Pa, and the temperature needs to be controlled between 260 to 270° C. The reaction time should be 30 to 50 mins. The catalyst the reaction used is the mixture of magnesium ethylene glycol and antimony ethylene glycol.

The high vacuum stage of the condensation reaction requires continuously pumping vacuum after the low vacuum period in order to ensure that the reaction pressure is decreased to absolute pressure lower than 100 Pa. The reaction temperature needs to be controlled between 275 to 280° C., and the reaction time needs to be 50-90 mins.

d. Main Process Parameters of Spinning

The temperature of extrusion is 290 to 320° C.;
The air temperature of cooling is 20 to 30° C.;
The speed of winding is 4000 to 4600 m/min.

A process for preparing the yarn according to the present invention, characterized in that the molar ratio of the ethylene glycol to terephthalic acid is 1.2:1 to 2.0:1.

A process for preparing the yarn according to the present invention, characterized in that the mass ratio of magnesium ethylene glycol to antimony ethylene glycol in their mixture is 2 to 3:1. The mass of the catalyst is 0.01 to 0.05% of the terephthalic acid. This method uses the mixture of magnesium ethylene glycol and antimony ethylene glycol as a polycondensation catalyst. Magnesium ethylene glycol is relatively mild, the thermal degradation coefficient is small, and fewer side effects in the reaction process reduce production of terminal carboxyl and oligomer. Meanwhile, it also ensures the stability of unsaturated double bond in process of preparing polyester.

A process for preparing a flame-retardant polyester fiber according to the present invention, wherein the stabilizer is chosen from triphenyl phosphate, trimethyl phosphate and trimethyl phosphite. The mass of stabilizer is 0.01-0.05% of the terephthalic acid. Stabilizers are mainly phosphate ester, whose function is to capture the reaction generated during the polymerization of free radicals, reduce side effects, and also protect the unsaturated double bond.

A process for preparing a flame-retardant polyester fiber according to the present invention, wherein the mass ratio of the flame retardant 2-carboxyethyl phenyl phosphinic acid (CEPPA) and terephthalic acid is of 1.5 to 3:100

A process for preparing a flame-retardant polyester fiber according to the present invention, wherein the unsaturated dibasic acid and terephthalic acid molar ratio of 1 to 5:100.

A process for preparing a flame-retardant polyester fiber according to the present invention, wherein the unsaturated dibasic acid maleic acid, fumaric acid, one of the maleic acid.

A process for preparing a flame-retardant polyester fiber according to the present invention, wherein the UV initiator is cobalt naphthenate, cobalt acetate, naphthenate, zinc stearate, zinc acetate in an amount of 0.03% to 0.05% by weight of terephthalic acid.

A process for preparing a flame-retardant polyester fiber according to the present invention, wherein the UV-irradiated ultraviolet light has an intensity of 100-120 mj/cm$^2$.

Photoinitiator is a key component of the crosslinking system. Initiator molecules have a certain light absorption ability in the UV range (250~420 nm). After absorbing light energy, the initiator molecules change from the ground state to the active excited state and continue to change to excited singlet state. In its excited singlet state, or after being excited singlet state undergoes a single molecule or bimolecular chemical action, the production of active fragments can trigger the polymerization of monomers, these active fragments can be free radicals, which can trigger the crosslinking reaction.

The choice of metal salts as the initiator is mainly because its high thermal stability, that is, in the polymerization, spinning process remains stable, while cobalt salts and zinc salts on the polyester polymerization reaction does not have a negative impact, cobalt salts can also be as a polyester toner.

Due to the existence of unsaturated double bonds in the unsaturated polyester molecular structure, under the condition of the initiator, the long chain molecules of the unsaturated polyester may undergo cross-linking reaction to form a huge mesh-like molecule with a complicated structure. Crosslinking is one of the most direct and effective ways to improve polymer performance. Crosslinking can make the crosslinking degree of the system increase, the relative molecular mass increases, and the physicochemical properties of the polymer increase obviously.

The invention is characterized in that the double bond is opened and the cross-linking is completed after the polyester fiber is stretched and heat-set. Polyester fiber to obtain high strength and modulus must be magnificently stretched, while the impact of tensile properties of polyester is an important factor in the process of entanglement polyester density, entanglement of polyester fibers can cause tensile properties to decline. Unsaturated double bonds in the present invention are added during the polymerization, with the addition of stabilizers to reduce the generation of free radicals, and photoinitiators can maintain stability throughout the polymerization spinning process, thus ensures the polymerization, the spinning process stable and normal.

The object of the present invention is to provide a flame-retardant polyester fiber which uses a relatively mild type of polycondensation catalyst, magnesium ethylene glycol, to induce less side reactions during the reaction and to effectively control the terminal carboxyl group content and processing less thermal degradation, reducing the production of oligomers in the process, but also to ensure the stability of the unsaturated double bonds in the polyester production process. Flame retardant 2-carboxyethylphenylphosphinic acid aims to improve the flame retardant properties of polyester. The polyester containing unsaturated double bond is used in UV irradiation, and the double bond opens to form a crosslinking point, forming a certain amount of the network structure that improves the heat-resistant temperature of the polydextrose fiber, and improves anti-droplet properties of polyester fiber. Adding unsaturated double bonds in the polyester fiber, and controlling its cross link effectively and safely, the gel content of cross-linked fibers will be a substantial increase in the mechanical properties of polyester fibers, heat resistance, chemical resistance, flame retardant properties have a more substantial increase.

Benefits:

This method uses the mixture of magnesium ethylene glycol and antimony ethylene glycol as a polycondensation catalyst. Magnesium ethylene glycol is relatively mild, the thermal degradation coefficient is small, and fewer side effects in the reaction process reduce production of terminal carboxyl and oligomer. Meanwhile, it also ensures the stability of unsaturated double bond in process of preparing polyester.

Polyester contains 1 to 6 unsaturated double bonds in the macromolecular chain provided by unsaturated dibasic acid molecules on average.

Flame retardant 2-carboxyethylphenylphosphinic acid to improve the flame retardant properties of polyester, the use of polyester containing unsaturated double bond in UV irradiation, the double bond opens to form a crosslinking point, the formation of a certain amount of the network structure improves the heat-resistant temperature of the poly-fiber and improves the anti-dripping performance of the polyester fiber.

The introduction of unsaturated double bonds in the polyester, and polyester fiber preparation is completed effectively and safely control the cross-linking, cross-linked fiber content will be a substantial increase in the gel, the mechanical properties of polyester fibers, heat-resistant Performance, chemical resistance, flame retardant properties have a more substantial increase.

DETAILED DESCRIPTION OF THE EMBODIMENTS

Hereinafter, the present invention will be described in more detail by the following examples, but not limited thereto. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended claims of this application.

The present invention discloses a flame-retardant polyester fiber. The flame-retardant polyester fiber according to the present invention is obtained by the flame-retardant polyester being spun and irradiated by ultraviolet light. The flame-retardant polyester fiber has a maximum oxygen index value greater than 30, and the fiber has good anti-drop properties on the basis of flame-resistance. Flame-retardant polyester is obtained by the esterification reaction of terephthalic acid, unsaturated dibasic acid and ethylene glycol followed by adding a flame retardant ethylene glycol 2-carboxyethyl phenyl phosphonic acid, and followed by the polycondensation catalyzed by the mixture of magnesium ethylene glycol and antimony ethylene glycol. Then the polyester sections are obtained by granulation.

The flame-retardant polyester according to the present invention contains, on average, 1 to 6 unsaturated double bonds provided by unsaturated dibasic acid molecules in one macromer chain.

A process for preparing the ultra-low shrinkage industrial yarn according to the present invention, wherein the molecular formula of magnesium ethylene glycol is $Mg(OCH_2CH_2OH)_2$.

A flame-retardant polyester fiber as described above, wherein the flame-retardant polyester fiber has a linear density deviation of ≤0.5%, a breaking strength of ≥3.5 cN/dtex, CV value of breaking strength of ≤5.0% and breaking extension of 33.0±3.0%, CV value of breaking extension of ≤10.0%, the CV value of dry unevenness of ≤2.00%, the boiling water shrinkage of 7.5±0.5% and the oil content of 0.90±0.20%.

A process for preparing the flame-retardant polyester fiber as described above, wherein the mass ratio of magnesium ethylene glycol to antimony ethylene glycol is 2~3:1 in the mixture of magnesium ethylene glycol and antimony ethylene glycol.

The present invention also provides a method for preparing a flame-retardant polyester fiber, after the esterification reaction of terephthalic acid, unsaturated dibasic acid and ethylene glycol add a flame retardant 2-carboxyethylphenyl phosphine. Then the polyester is obtained by polycondensation under the catalysis of the mixture of the magnesium ethylene glycol and antimony ethylene glycol. Polyester sections are obtained after granulation. Then by metering, extrusion, cooling, oiling, stretching, heat setting, winding and UV irradiation, flame retardant polyester fiber can be obtained.

Example 1

A process for preparing the flame retardant polyester fiber, wherein the main process is:

a. The Preparation of Catalyst (Magnesium Ethylene Glycol)

Add ethylene into the single-compartment electrolytic cell, magnesium chloride is electrolyte, the anode is magnesium, the cathode is graphite. Under DC, the initial voltage is 6V, the cathode current density is 150 mA, and electrolysis is carried out for 10 hours at 50° C. Remove the electrode after the electrolysis, we can get white suspension. Filter it under reduced pressure, wash the white solid with anhydrous ethanol, and we get magnesium ethylene glycol.

b. The Preparation of Flame Retardant

Mix 2-carboxyethylphenylphosphinic acid (CEPPA) and ethylene glycol at a molar ratio of 1:2, and the mixture is reacted at 100° C. for 30 min to synthesize 2-carboxyethylphenylphosphinic acid ethylene glycol ester (CEPPA-EG).

c. The Preparation of Polyester, Including the Esterification and Polycondensation The esterification reaction uses terephthalic acid, unsaturated dicarboxylic acid maleic acid and ethylene glycol as raw materials, the molar ratio of ethylene glycol to terephthalic acid is 1.2:1, the molar ratio of unsaturated dibasic acid to terephthalic acid Ratio of 1:100, dubbed a uniform slurry after the esterification reaction, esterification product obtained, and then added flame retardant 2-carboxyethyl phenyl phosphinic acid (CEPPA), the molar ratio of terephthalic acid 1.5:100. The esterification reaction is pressurized under a nitrogen atmosphere, and the pressure is controlled at normal pressure, at temperature of 250° C. The esterification water distillate amount reaches 92% of the theoretical value as the esterification reaction ends. The condensation reaction, includes the low vacuum stage and the high vacuum stage of the condensation reaction:

In the reaction low-vacuum stage, catalyst, triphenyl phosphate stabilizer and cobalt naphthenate initiator, the amount of catalyst is terephthalic acid 0.01%, cobalt naphthenate is added in an amount of 0.03% by weight of terephthalic acid, triphenyl phosphate in an amount of 0.01% by weight of terephthalic acid, and ultraviolet light having an intensity of ultraviolet light of 100 mj/cm$^2$ started polycondensation reaction under negative pressure. The pressure from atmospheric pressure steadily pumped to an absolute pressure of 498 Pa, the temperature controlled at 260° C., the reaction time was 30 minutes. The catalyst is a mixture of magnesium ethylene glycol and antimony ethylene glycol, wherein the mass ratio of magnesium ethylene glycol and antimony ethylene glycol is 2:1.

The high vacuum stage of the condensation reaction requires continuously pumping vacuum after the low vacuum period in order to ensure that the reaction pressure is decreased to absolute pressure 98 Pa. The reaction temperature needs to be controlled between 275° C., and the reaction time needs to be 50 mins. After granulation, the polyester section is obtained.

d. Solid State Polycondensation

The intrinsic viscosity of polyester section increased to 0.9 dL/g through solid-phase polycondensation, which is unsaturated double bond polyester high-viscosity section.

e. Main Process Parameters of Spinning

The temperature of extrusion is 290° C.;
The air temperature of cooling is 20° C.;
The speed of winding is 4000 m/min.

The obtained flame-retardant polyester fiber had a gel content of 13% and a melting temperature of 276° C. The flame-retardant polyester fiber has dry heat shrinkage of 2.6%, a linear density deviation of 1.3%, breaking strength of 7.5 cN/dtex, CV value of breaking strength of 2.2% and breaking extension of 10.5%, CV value of breaking extension of 6.8% under the testing condition of 177° C.×10 min×0.05 cN/dtex. The maximum oxygen index value of the flame-retardant polyester fiber is 32.

Example 2

A process for preparing the flame retardant polyester fiber, wherein the main process is:

a. The Preparation of Catalyst (Magnesium Ethylene Glycol)

Add ethylene into the single-compartment electrolytic cell, magnesium chloride is electrolyte, the anode is magnesium, the cathode is graphite. Under DC, the initial voltage is 10V, the cathode current density is 200 mA, and electrolysis is carried out for 12 hours at 60° C. Remove the electrode after the electrolysis, we can get white suspension. Filter it under reduced pressure, wash the white solid with anhydrous ethanol, and we get magnesium ethylene glycol.

b. The Preparation of Flame Retardant

Mix 2-carboxyethylphenylphosphinic acid (CEPPA) and ethylene glycol at a molar ratio of 1:3, and the mixture is reacted at 120° C. for 60 min to synthesize 2-carboxyethylphenylphosphinic acid ethylene glycol ester (CEPPA-EG).

c. The Preparation of Polyester, Including the Esterification and Polycondensation The esterification reaction uses terephthalic acid, unsaturated dicarboxylic acid maleic acid and ethylene glycol as raw materials, the molar ratio of ethylene glycol to terephthalic acid is 2.0:1, the molar ratio of unsaturated dibasic acid to terephthalic acid Ratio of 5:100, dubbed a uniform slurry after the esterification reaction, esterification product obtained, and then added flame retardant 2-carboxyethyl phenyl phosphinic acid (CEPPA), the molar ratio of terephthalic acid 3:100. The esterification reaction is pressurized under a nitrogen atmosphere, and the pressure is controlled at pressure of 0.3 MPa, at temperature of 260° C. The esterification water distillate amount reaches 95% of the theoretical value as the esterification reaction ends. The condensation reaction, includes the low vacuum stage and the high vacuum stage of the condensation reaction:

In the reaction low-vacuum stage, catalyst, triphenyl phosphate stabilizer and cobalt naphthenate initiator, the amount of catalyst is terephthalic acid 0.05%, cobalt naphthenate is added in an amount of 0.05% by weight of terephthalic acid, triphenyl phosphate in an amount of 0.05% by weight of terephthalic acid, and ultraviolet light having an intensity of ultraviolet light of 120 mj/cm$^2$ started polycondensation reaction under negative pressure. The pressure from atmospheric pressure steadily pumped to an absolute pressure of 496 Pa, the temperature controlled at 270° C., the reaction time was 50 minutes. The catalyst is a mixture of magnesium ethylene glycol and antimony ethylene glycol, wherein the mass ratio of magnesium ethylene glycol and antimony ethylene glycol is 3:1.

The high vacuum stage of the condensation reaction requires continuously pumping vacuum after the low vacuum period in order to ensure that the reaction pressure is decreased to absolute pressure 97 Pa. The reaction temperature needs to be controlled between 280° C., and the reaction time needs to be 90 mins. After granulation, the polyester section is obtained.

d. Solid State Polycondensation

The intrinsic viscosity of polyester section increased to 1.2 dL/g through solid-phase polycondensation, which is unsaturated double bond polyester high-viscosity section.

e. Main Process Parameters of Spinning

The temperature of extrusion is 320° C.;
The air temperature of cooling is 30° C.;
The speed of winding is 4600 m/min.

The obtained flame-retardant polyester fiber had a gel content of 18% and a melting temperature of 296° C. The flame-retardant polyester fiber has dry heat shrinkage of 2.9%, a linear density deviation of 1.3%, breaking strength of 7.6 cN/dtex, CV value of breaking strength of 2.3% and breaking extension of 12.6%, CV value of breaking extension of 6.2% under the testing condition of 177° C.×10 min×0.05 cN/dtex. The maximum oxygen index value of the flame-retardant polyester fiber is 33.

Example 3

A process for preparing the flame retardant polyester fiber, wherein the main process is:

a. The Preparation of Catalyst (Magnesium Ethylene Glycol)

Add ethylene into the single-compartment electrolytic cell, magnesium chloride is electrolyte, the anode is magnesium, the cathode is graphite. Under DC, the initial voltage is 8V, the cathode current density is 160 mA, and electrolysis is carried out for 11 hours at 55° C. Remove the electrode after the electrolysis, we can get white suspension. Filter it under reduced pressure, wash the white solid with anhydrous ethanol, and we get magnesium ethylene glycol.

b. The Preparation of Flame Retardant

Mix 2-carboxyethylphenylphosphinic acid (CEPPA) and ethylene glycol at a molar ratio of 1:2, and the mixture is reacted at 105° C. for 40 min to synthesize 2-carboxyethylphenylphosphinic acid ethylene glycol ester (CEPPA-EG).

c. The Preparation of Polyester, Including the Esterification and Polycondensation The esterification reaction uses terephthalic acid, unsaturated dicarboxylic acid maleic acid and ethylene glycol as raw materials, the molar ratio of ethylene glycol to terephthalic acid is 1.5:1, the molar ratio of unsaturated dibasic acid to terephthalic acid ratio of 2:100, dubbed a uniform slurry after the esterification reaction, esterification product obtained, and then added flame retardant 2-carboxyethyl phenyl phosphinic acid (CEPPA), the molar ratio of terephthalic acid 2.5:100. The esterification reaction is pressurized under a nitrogen atmosphere, and the pressure is controlled at pressure of 0.2 MPa, at temperature of 255° C. The esterification water distillate amount reaches 94% of the theoretical value as the esterification reaction ends. The condensation reaction, includes the low vacuum stage and the high vacuum stage of the condensation reaction:

In the reaction low-vacuum stage, catalyst, triphenyl phosphate stabilizer and cobalt naphthenate initiator, the amount of catalyst is terephthalic acid 0.02%, cobalt naphthenate is added in an amount of 0.04% by weight of terephthalic acid, triphenyl phosphate in an amount of 0.02% by weight of terephthalic acid, and ultraviolet light having an intensity of ultraviolet light of 110 mj/cm$^2$ started polycondensation reaction under negative pressure. The pressure from atmospheric pressure steadily pumped to an absolute pressure of 495 Pa, the temperature controlled at 265° C., the reaction time was 35 minutes. The catalyst is a mixture of magnesium ethylene glycol and antimony ethylene glycol, wherein the mass ratio of magnesium ethylene glycol and antimony ethylene glycol is 2:1.

The high vacuum stage of the condensation reaction requires continuously pumping vacuum after the low vacuum period in order to ensure that the reaction pressure is decreased to absolute pressure 96 Pa. The reaction temperature needs to be controlled between 278° C., and the reaction time needs to be 55 mins. After granulation, the polyester section is obtained.

d. Solid State Polycondensation

The intrinsic viscosity of polyester section increased to 1.2 dL/g through solid-phase polycondensation, which is unsaturated double bond polyester high-viscosity section.

e. Main Process Parameters of Spinning

The temperature of extrusion is 295° C.;
The air temperature of cooling is 25° C.;
The speed of winding is 4200 m/min.

The obtained flame-retardant polyester fiber had a gel content of 12% and a melting temperature of 277° C. The flame-retardant polyester fiber has dry heat shrinkage of 2.5%, a linear density deviation of 1.5%, breaking strength of 7.8 cN/dtex, CV value of breaking strength of 2.3% and breaking extension of 12.8%, CV value of breaking extension of 6.3% under the testing condition of 177° C.×10 min×0.05 cN/dtex. The maximum oxygen index value of the flame-retardant polyester fiber is 32.

Example 4

A process for preparing the flame retardant polyester fiber, wherein the main process is:

a. The Preparation of Catalyst (Magnesium Ethylene Glycol)

Add ethylene into the single-compartment electrolytic cell, magnesium chloride is electrolyte, the anode is magnesium, the cathode is graphite. Under DC, the initial voltage is 8V, the cathode current density is 180 mA, and electrolysis is carried out for 11 hours at 55° C. Remove the electrode after the electrolysis, we can get white suspension. Filter it under reduced pressure, wash the white solid with anhydrous ethanol, and we get magnesium ethylene glycol.

b. The Preparation of Flame Retardant

Mix 2-carboxyethylphenylphosphinic acid (CEPPA) and ethylene glycol at a molar ratio of 1:3, and the mixture is reacted at 110° C. for 38 min to synthesize 2-carboxyethylphenylphosphinic acid ethylene glycol ester (CEPPA-EG).

c. The Preparation of Polyester, Including the Esterification and Polycondensation The esterification reaction uses terephthalic acid, unsaturated dicarboxylic acid maleic acid and ethylene glycol as raw materials, the molar ratio of ethylene glycol to terephthalic acid is 1.5:1, the molar ratio of unsaturated dibasic acid to terephthalic acid ratio of 2:100, dubbed a uniform slurry after the esterification reaction, esterification product obtained, and then added flame retardant 2-carboxyethyl phenyl phosphinic acid (CEPPA), the molar ratio of terephthalic acid 3:100. The esterification reaction is pressurized under a nitrogen atmosphere, and the pressure is controlled at pressure of 0.3 MPa, at temperature of 250° C. The esterification water distillate amount reaches 93% of the theoretical value as the esterification reaction ends. The condensation reaction, includes the low vacuum stage and the high vacuum stage of the condensation reaction:

In the reaction low-vacuum stage, catalyst, triphenyl phosphate stabilizer and cobalt naphthenate initiator, the amount of catalyst is terephthalic acid 0.01%, cobalt naphthenate is added in an amount of 0.05% by weight of terephthalic acid, triphenyl phosphate in an amount of 0.01% by weight of terephthalic acid, and ultraviolet light having an intensity of ultraviolet light of 110 mj/cm$^2$ started polycondensation reaction under negative pressure. The pressure from atmospheric pressure steadily pumped to an absolute pressure of 492 Pa, the temperature controlled at 262° C., the reaction time was 34 minutes. The catalyst is a mixture of magnesium ethylene glycol and antimony ethylene glycol, wherein the mass ratio of magnesium ethylene glycol and antimony ethylene glycol is 2:1.

The high vacuum stage of the condensation reaction requires continuously pumping vacuum after the low vacuum period in order to ensure that the reaction pressure is decreased to absolute pressure 95 Pa. The reaction temperature needs to be controlled between 276° C., and the reaction time needs to be 80 mins. After granulation, the polyester section is obtained.

d. Solid State Polycondensation

The intrinsic viscosity of polyester section increased to 1.1 dL/g through solid-phase polycondensation, which is unsaturated double bond polyester high-viscosity section.

e. Main Process Parameters of Spinning

The temperature of extrusion is 300° C.;
The air temperature of cooling is 25° C.;
The speed of winding is 4600 m/min.

The obtained flame-retardant polyester fiber had a gel content of 19% and a melting temperature of 277° C. The flame-retardant polyester fiber has dry heat shrinkage of 2.7%, a linear density deviation of 1.1%, breaking strength of 7.9 cN/dtex, CV value of breaking strength of 2.2% and breaking extension of 12.8%, CV value of breaking extension of 6.1% under the testing condition of 177° C.×10 min×0.05 cN/dtex. The maximum oxygen index value of the flame-retardant polyester fiber is 33.

Example 5

A process for preparing the flame retardant polyester fiber, wherein the main process is:

a. The preparation of catalyst (magnesium ethylene glycol)

Add ethylene into the single-compartment electrolytic cell, magnesium chloride is electrolyte, the anode is magnesium, the cathode is graphite. Under DC, the initial voltage is 6V, the cathode current density is 200 mA, and electrolysis is carried out for 10 hours at 60° C. Remove the electrode after the electrolysis, we can get white suspension. Filter it under reduced pressure, wash the white solid with anhydrous ethanol, and we get magnesium ethylene glycol.

b. The Preparation of Flame Retardant

Mix 2-carboxyethylphenylphosphinic acid (CEPPA) and ethylene glycol at a molar ratio of 1:3, and the mixture is reacted at 112° C. for 36 min to synthesize 2-carboxyethylphenylphosphinic acid ethylene glycol ester (CEPPA-EG).

c. The Preparation of Polyester, Including the Esterification and Polycondensation The esterification reaction uses terephthalic acid, unsaturated dicarboxylic acid maleic acid and ethylene glycol as raw materials, the molar ratio of ethylene glycol to terephthalic acid is 1.6:1, the molar ratio of unsaturated dibasic acid to terephthalic acid ratio of 2:100, dubbed a uniform slurry after the esterification reaction, esterification product obtained, and then added flame retardant 2-carboxyethyl phenyl phosphinic acid (CEPPA), the molar ratio of terephthalic acid 1.8:100. The esterification reaction is pressurized under a nitrogen atmosphere, and the pressure is controlled at air pressure, at temperature of 250° C. The esterification water distillate amount reaches 92% of the theoretical value as the esterification reaction ends. The condensation reaction, includes the low vacuum stage and the high vacuum stage of the condensation reaction:

In the reaction low-vacuum stage, catalyst, triphenyl phosphate stabilizer and cobalt naphthenate initiator, the amount of catalyst is terephthalic acid 0.01%, cobalt naphthenate is added in an amount of 0.05% by weight of terephthalic acid, triphenyl phosphate in an amount of 0.05% by weight of terephthalic acid, and ultraviolet light having an intensity of ultraviolet light of 100 mj/cm$^2$ started polycondensation reaction under negative pressure. The pressure from atmospheric pressure steadily pumped to an absolute pressure of 495 Pa, the temperature controlled at 260° C., the reaction time was 30 minutes. The catalyst is a mixture of magnesium ethylene glycol and antimony ethylene glycol, wherein the mass ratio of magnesium ethylene glycol and antimony ethylene glycol is 3:1.

The high vacuum stage of the condensation reaction requires continuously pumping vacuum after the low vacuum period in order to ensure that the reaction pressure is decreased to absolute pressure 96 Pa. The reaction temperature needs to be controlled between 277° C., and the reaction time needs to be 50 mins. After granulation, the polyester section is obtained.

d. Solid State Polycondensation

The intrinsic viscosity of polyester section increased to 1.2 dL/g through solid-phase polycondensation, which is unsaturated double bond polyester high-viscosity section.

e. Main Process Parameters of Spinning

The temperature of extrusion is 320° C.;
The air temperature of cooling is 20° C.;
The speed of winding is 4000 m/min.

The obtained flame-retardant polyester fiber had a gel content of 19% and a melting temperature of 275° C. The flame-retardant polyester fiber has dry heat shrinkage of 2.0%, a linear density deviation of 1.1%, breaking strength of 8.9 cN/dtex, CV value of breaking strength of 2.2% and breaking extension of 13.2%, CV value of breaking extension of 6.8% under the testing condition of 177° C.×10 min×0.05 cN/dtex. The maximum oxygen index value of the flame-retardant polyester fiber is 34.

What is claimed is:

1. A flame-retardant polyester fiber,
wherein the flame-retardant polyester fiber is produced by spinning a flame-retardant polyester and subjecting the flame-retardant polyester to UV irradiation,
wherein the flame-retardant polyester fiber has a maximum oxygen index value greater than 30, wherein the flame-retardant polyester is produced by an esterification reaction of terephthalic acid, unsaturated dibasic acid and ethylene glycol; followed by adding flame-retardant 2-carboxyethyl phenyl phosphonic acid ethylene glycol ester, and followed by a polycondensation catalyzed by a mixture of magnesium ethylene glycol and antimony ethylene glycol;

wherein, in the flame-retardant polyester, a macromolecular chain of the flame-retardant polyester contains an average of 1 to 6 unsaturated double bonds provided by the unsaturated dibasic acid molecules;

wherein the formula of the magnesium ethylene glycol is $Mg(OCH_2CH_2OH)_2$.

2. The flame-retardant polyester fiber according to claim 1, wherein, in the mixture of the magnesium ethylene glycol and the antimony ethylene glycol, a mass ratio of the magnesium ethylene glycol to the antimony ethylene glycol is (2-3):1.

* * * * *